United States Patent
Abe et al.

(10) Patent No.: US 10,569,788 B2
(45) Date of Patent: Feb. 25, 2020

(54) AUTOMATIC DRIVING CONTROL APPARATUS

(71) Applicant: SUBARU CORPORATION, Tokyo (JP)

(72) Inventors: Akiyuki Abe, Tokyo (JP); Masatoshi Hoshina, Tokyo (JP); Yasuhiro Sekijima, Tokyo (JP); Keisuke Kuwahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 164 days.

(21) Appl. No.: 15/814,000

(22) Filed: Nov. 15, 2017

(65) Prior Publication Data

US 2018/0148070 A1    May 31, 2018

(30) Foreign Application Priority Data

Nov. 29, 2016 (JP) ................. 2016-231350

(51) Int. Cl.
*B60W 10/20* (2006.01)
*B60W 30/10* (2006.01)
(Continued)

(52) U.S. Cl.
CPC .......... *B60W 50/082* (2013.01); *B60W 30/10* (2013.01); *B60W 30/143* (2013.01);
(Continued)

(58) Field of Classification Search
None
See application file for complete search history.

(56) References Cited

U.S. PATENT DOCUMENTS

2017/0334451 A1* 11/2017 Asakura ............ B60W 50/0098
2018/0004211 A1* 1/2018 Grimm ............... G01C 21/3407
(Continued)

FOREIGN PATENT DOCUMENTS

JP    2009-031205 A    2/2009
JP    2014-119372 A    6/2014
(Continued)

OTHER PUBLICATIONS

Japanese Notification of Reasons for Refusal issued in corresponding Japanese Patent Application No. 2016-231350, dated Jul. 10, 2018, with English Translation.

*Primary Examiner* — Tuan C To
*Assistant Examiner* — Kelly D Williams
(74) *Attorney, Agent, or Firm* — McDermott Will & Emery LLP

(57) ABSTRACT

An automatic driving control apparatus includes a controller. Upon execution of automatic driving control, the controller determines, on the basis of positioning and map information, presence of a tollgate within a predetermined distance from a vehicle. The controller makes a transition to a tollgate passing mode, on a condition that the presence of the tollgate is determined within the predetermined distance and an increase in width of the road is recognized on the basis of the recognition of the outside environment. The controller causes the vehicle to approach the tollgate, on the basis of one or both of the map information and position information of an object recognized on the basis of the recognition of the outside environment, in a first period of time during which the tollgate passing mode is set and a position of the tollgate is unrecognizable on the basis of the recognition of the outside environment.

8 Claims, 6 Drawing Sheets

(51) Int. Cl.

| | |
|---|---|
| *B60W 30/14* | (2006.01) |
| *B60W 30/182* | (2020.01) |
| *B60W 50/08* | (2020.01) |
| *G05D 1/00* | (2006.01) |
| *G05D 1/02* | (2020.01) |
| *G07B 15/00* | (2011.01) |
| *G07B 15/06* | (2011.01) |

(52) U.S. Cl.
CPC ......... *G05D 1/0061* (2013.01); *G05D 1/0088* (2013.01); *G05D 1/0212* (2013.01); *G07B 15/00* (2013.01); *G07B 15/06* (2013.01); *B60W 2550/141* (2013.01); *B60W 2550/143* (2013.01); *B60W 2550/146* (2013.01); *B60W 2550/308* (2013.01); *G05D 2201/0213* (2013.01)

(56) References Cited

U.S. PATENT DOCUMENTS

2018/0024562 A1* 1/2018 Bellaiche ................ G01S 19/48
                                                              701/26
2018/0113460 A1* 4/2018 Koda ................... G05D 1/0088

FOREIGN PATENT DOCUMENTS

| JP | 2015-111386 A | 6/2015 |
|---|---|---|
| JP | 2016-137819 A | 8/2016 |
| JP | 2016-153738 A | 8/2016 |

\* cited by examiner

AUTOMATIC DRIVING CONTROL APPARATUS

CROSS-REFERENCE TO RELATED APPLICATIONS

The present application claims priority from Japanese Patent Application No. 2016-231350 filed on Nov. 29, 2016, the entire contents of which are hereby incorporated by reference.

BACKGROUND

The technology relates to an automatic driving control apparatus, for a vehicle, that is provided with an outside environment recognizer.

Japanese Unexamined Patent Application Publication (JP-A) No. 2016-137819 discloses an automatic driving control apparatus for a vehicle that travels on a road. Specifically, JP-A No. 2016-137819 discloses the automatic driving control apparatus that, after allowing for traveling on an expressway by an automatic driving control, deactivates an automatic driving state and performs switching from the automatic driving state to a manual driving state at a point where exiting from an interchange is performed.

SUMMARY

For an automatic driving control apparatus for a vehicle such as that described above, it is generally desired to achieve effective automatic driving.

It is desirable to provide an automatic driving control apparatus that is able to allow for effective automatic driving.

An aspect of the technology provides an automatic driving control apparatus including an outside environment recognizer, a traveling information detector, a positioning device, a map information output device, and a controller. The outside environment recognizer is configured to recognize an outside environment of a vehicle. The traveling information detector is configured to detect traveling information of the vehicle. The positioning device is configured to perform positioning of the vehicle. The map information output device is configured to store map information including information on a road shape. The controller executes an automatic driving control of the vehicle on the basis of one or more of a result of the recognition of the outside environment, the traveling information, a result of the positioning, and the map information. Upon the execution of the automatic driving control, the controller determines, on the basis of the result of the positioning and the map information, presence or absence of a tollgate within a predetermined distance, from the vehicle, on a road on which the vehicle travels. The controller makes a transition in an operation mode of the vehicle from a regular traveling mode to a tollgate passing mode, on one of a condition that the presence of the tollgate is determined within the predetermined distance from the vehicle and an increase in width of the road is recognized on the basis of the result of the recognition of the outside environment, and a condition that the presence of the tollgate is determined within the predetermined distance from the vehicle and the width of the road becomes unrecognizable on the basis of the result of the recognition of the outside environment. The controller controls, in a first period of time, each of a traveling speed of the vehicle and a steering angle of the vehicle to thereby cause the vehicle to approach the tollgate, on the basis of one or both of the map information and position information of an object that is recognized on the basis of the result of the recognition of the outside environment. The first period of time is a period of time during which the operation mode of the vehicle is set to the tollgate passing mode, and a position of the tollgate is unrecognizable on the basis of the result of the recognition of the outside environment. The controller controls, in a second period of time, each of the traveling speed of the vehicle and the steering angle of the vehicle to thereby cause the vehicle to pass through the tollgate, on the basis of position information of the tollgate that is recognized on the basis of the result of the recognition of the outside environment. The second period of time is a period of time during which the operation mode of the vehicle is set to the tollgate passing mode, and the position of the tollgate is recognizable on the basis of the result of the recognition of the outside environment.

DETAILED DESCRIPTION

Figure 1:
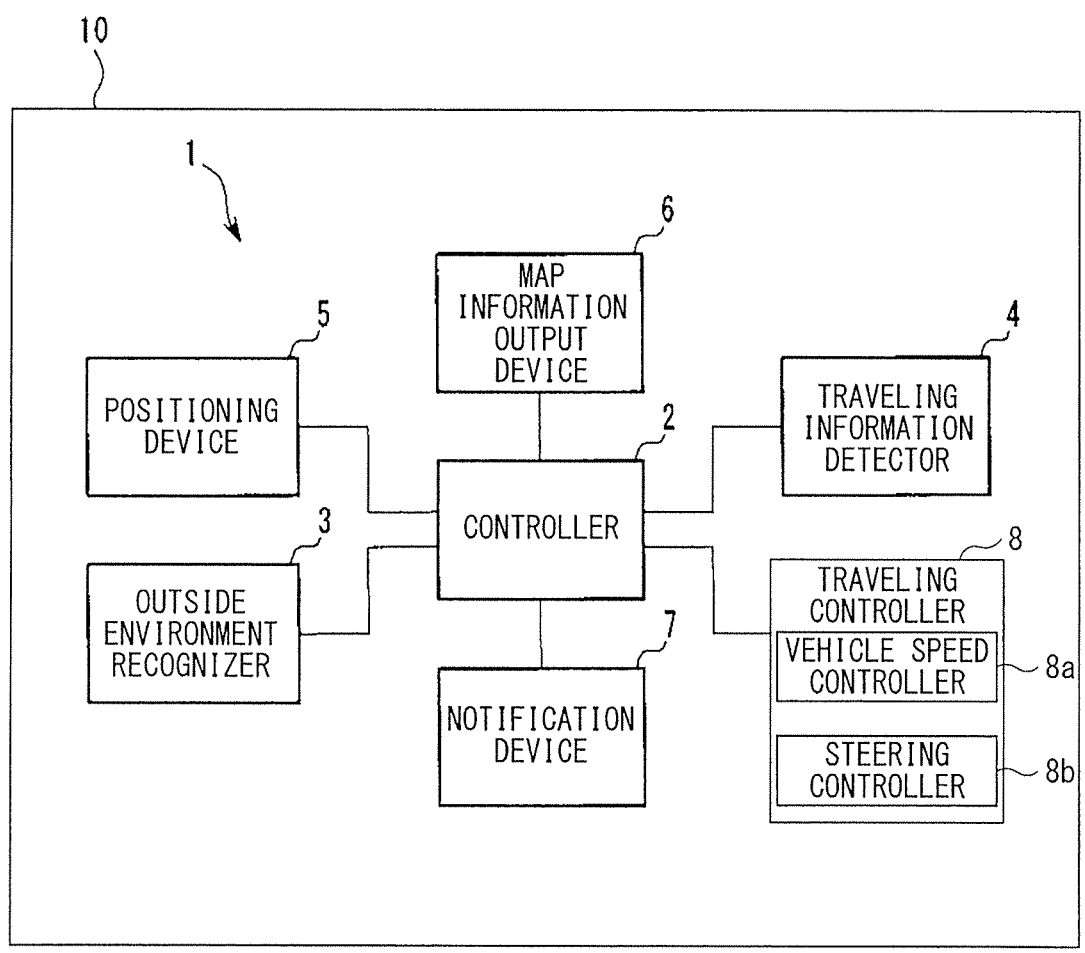
FIG. 1 is a block diagram illustrating an example of a configuration of an automatic driving control apparatus according to one implementation of the technology.

Some implementations of the technology are described below with reference to the accompanying drawings. It is to be noted that components illustrated in the drawings referred to in the description below differ from each other in scale. Thus, the respective components are illustrated in respective sizes that are recognizable in the drawings. Therefore, the technology is not limited to the numbers of the respective components, shapes of the respective components, ratios in size between the components, and relative positional relationships between the components illustrated in the drawings.

An automatic driving control apparatus 1 according to one implementation of the technology controls automatic driving of a vehicle 10 that travels on a road.

The vehicle 10 may have a configuration that allows for variation in an output generated by a power generator, variation in braking force generated by a brake device, and variation in steering angle, and variation in any other factor, on the basis of a control signal supplied from the automatic driving control apparatus 1. Non-limiting examples of the power generator may include an engine and an electric motor. Further, the vehicle 10 may be provided with a manual operation input device to be operated by a user of the vehicle 10 upon manual driving. The manual operation input device may include, for example but not limited to, a steering wheel, an accelerator pedal, a brake pedal, and a shift lever. The user of the vehicle 10 may be, for example but not limited to, a driver of the vehicle 10.

Referring to FIG. 1, the automatic driving control apparatus 1 according to the present implementation may include, for example but not limited to, a controller 2, an outside environment recognizer 3, a traveling information detector 4, a positioning device 5, a map information output device 6, a notification device 7, and a traveling controller 8.

The controller 2 may include, for example but not limited to, a computer provided with components such as a central processing unit (CPU), a read-only memory (ROM), a random-access memory (RAM), and an input-output unit that are coupled to a bus. The controller 2 may control an operation of the automatic driving control apparatus 1 on the basis of a predetermined program.

The outside environment recognizer 3 recognizes an outside environment of the vehicle 10. Specifically, the outside environment recognizer 3 may detect an environment including a shape of a road on which the vehicle 10 travels, and a positional relationship between the vehicle 10 and an object present around the vehicle 10. The outside environment recognizer 3 may include one or more of devices such as a camera, a millimeter-wave radar, and a lidar. In one example of the present implementation, the outside environment recognizer 3 may include a stereo camera that captures an image in a direction in which the vehicle 10 travels. In this example, the outside environment recognizer 3 may recognize the environment including the shape of the road and the object both ahead of the vehicle 10, on the basis of the image captured by the stereo camera.

The outside environment recognizer 3 may recognize the shape of the road ahead of the vehicle 10 by detecting a linear or dashed-line mark provided on the road by means of image recognition, for example. The linear or dashed-line mark may be so provided on the road along a traveling lane as to indicate the traveling lane, for example. In one implementation, the outside environment recognizer 3 may detect, by means of the image recognition or radar, an object that is provided along and aside of the road on which the vehicle 10 travels, and recognize the shape of the road ahead of the vehicle 10 on the basis of a result of the detection. Non-limiting examples of the object provided along and aside of the road may include a curb, a guardrail, and a side wall.

The outside environment recognizer 3 may also recognize, for example but not limited to, a preceding vehicle and a tollgate that are present ahead of the vehicle 10. The term "tollgate" as used herein refers to a gate-shaped facility directed to collecting a toll for a toll road. It is to be noted that the term "tollgate" as used herein encompasses a tollgate of an electronic toll collection system (ETC) that allows for payment such as advance payment and deferred payment of the toll without stopping a vehicle.

The traveling information detector 4 may recognize a traveling state of the vehicle 10 on the basis of a result of detection performed by a sensor with which the vehicle 10 is provided. Non-limiting examples of the sensor may include a traveling speed sensor, a steering angle sensor, an accelerometer, and an angular accelerometer.

The positioning device 5 may detect a current position of the vehicle 10 by means of one or more of a global positioning system (GPS), an inertial navigation system (INS), and vehicle-to-vehicle communication. The current position of the vehicle 10 may include factors such as latitude and longitude of the vehicle 10.

The map information output device 6 may include a storage storing map information, and output the map information. The map information may include, for example but not limited to, information on a shape of a road. Non-limiting examples of the information on the shape of the road may include a curvature of the road, a gradient of a longitudinal section of the road, and a state at an intersection of the road and another road. The map information may also include position information of the tollgate.

The notification device 7 may include, for example but not limited to, any of a display device displaying contents such as an image and a character, a light-emitting device emitting light, a speaker generating a sound, and a vibrator generating vibration, or any combination thereof. The notification device 7 may allow for an output, by the automatic driving control apparatus 1, of information to the user, such as the driver, of the vehicle 10.

The traveling controller 8 may perform a control that varies the output of the power generator of the vehicle 10, a control that varies the braking force of the brake device, and any other control. The traveling controller 8 may include, for example but not limited to, a vehicle speed controller 8a and a steering controller 8b. The vehicle speed controller 8a may control a traveling speed of the vehicle 10. The steering controller 8b may perform a control that varies a steering angle of the vehicle 10.

Upon execution of the automatic driving of the vehicle 10, the automatic driving control apparatus 1 having the example configuration described above may control each of the traveling speed and the steering angle of the vehicle 10 via the traveling controller 8 on the basis of a result of the recognition by the outside environment recognizer 3 and the traveling information detector 4. It is to be noted that a basic configuration directed to the execution of the automatic driving of the vehicle 10 may be, for example but not limited to, a known configuration which will not be described in detail herein.

Figure 2:
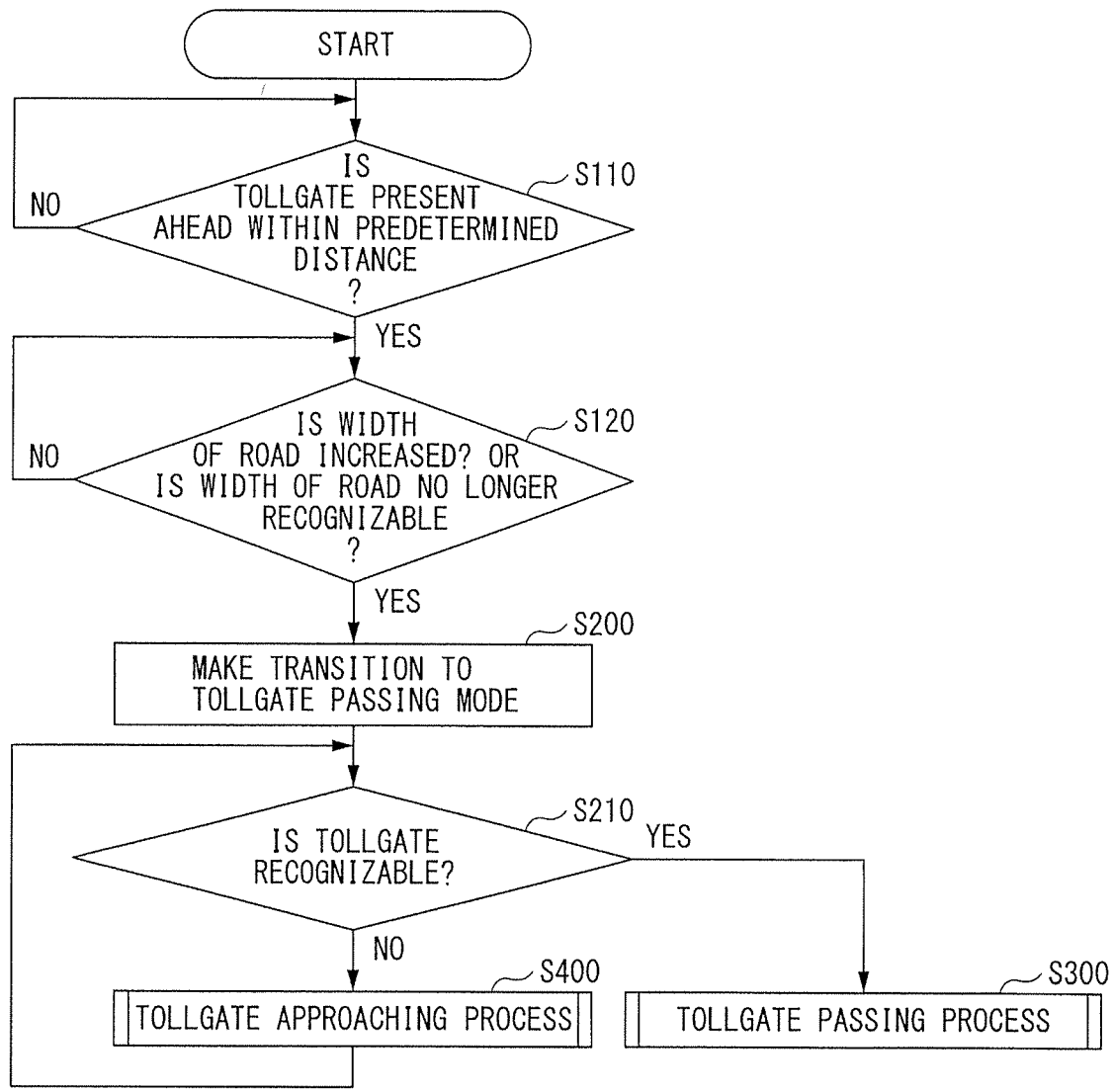
FIG. 2 is a flowchart describing an example of an operation of the automatic driving control apparatus illustrated in FIG. 1.

Referring to a flowchart illustrated in FIG. 2, a description is given next of a control performed by the controller 2 on the automatic driving control apparatus 1 when the vehicle 10 comes close to the tollgate. In the following description, the term "regular traveling mode" refers to an operation mode in which the automatic driving control apparatus 1 causes the vehicle 10 to travel along a path that is automatically or manually set in advance.

In the regular traveling mode, the automatic driving control apparatus 1 may set a target path along the shape of the road recognized by the outside environment recognizer 3, and so control each of the traveling speed and the steering angle of the vehicle 10 that the vehicle 10 travels along the set target path.

The processes described by the flowchart illustrated in FIG. 2 may be executed when the automatic driving of the vehicle 10 is executed in the regular traveling mode by the automatic driving control apparatus 1. It is to be noted that the following description refers to an example case where the tollgate is compatible to the ETC that allows the vehicle 10 to pass through the tollgate without stopping the vehicle 10.

Upon the execution of the automatic driving of the vehicle 10 by the automatic driving control apparatus 1 according to the present implementation, first, in step S110, the controller 2 may determine presence or absence of the tollgate ahead of the vehicle 10 on a road on which the vehicle 10 travels within a predetermined distance from the vehicle 10. The controller 2 may perform the determination of the presence or the absence of the tollgate on the basis of a result of the positioning by the positioning device 5 and the map information stored in the map information output device 6.

When the absence of the tollgate ahead of the vehicle 10 within the predetermined distance from the vehicle 10 is determined in step S110 (step S110: NO), the controller 2 may continue the regular traveling mode that causes the vehicle 10 to travel along the road on which the vehicle 10 travels.

In contrast, when the presence of the tollgate ahead of the vehicle 10 within the predetermined distance from the vehicle 10 is determined in step S110 (step S110: YES), the process to be performed by the controller 2 may proceed to step S120.

In step S120, the controller 2 determines whether a width, of the road on which the vehicle 10 travels, that is recognized by the outside environment recognizer 3 is increased. The outside environment recognizer 3 may recognize the width of the road by detecting the linear or dashed-line mark provided along the traveling lane on the basis of the image captured by the stereo camera. The foregoing detection of the linear or dashed-line mark may be performed, for example but not limited to, by means of the image recognition. In one implementation, the outside environment recognizer 3 may detect the object such as the curb, the guardrail, and the side wall that is provided along and aside of the road on which the vehicle 10 travels, and recognize the width of the road on the basis of a result of the detection. The outside environment recognizer 3 may perform the foregoing detection of the object, for example but not limited to, by means of the image recognition by the stereo camera or the radar.

Figure 5:
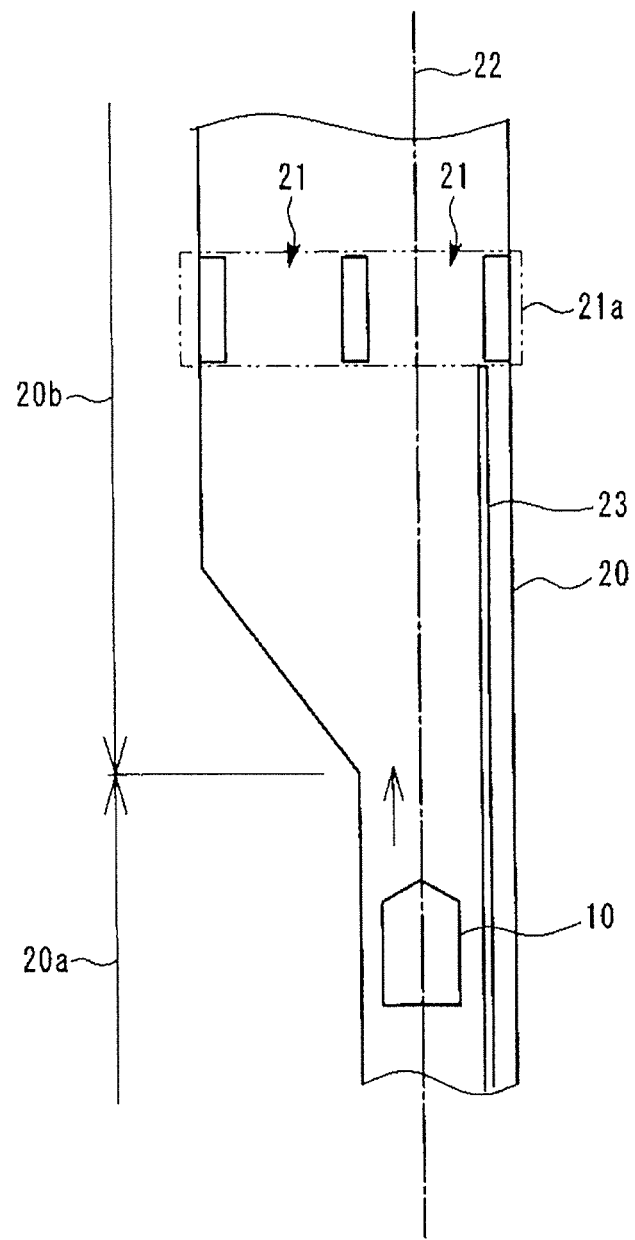
FIG. 5 schematically illustrates an example of a tollgate provided on a road.

FIG. 5 illustrates an example of a road 20 provided with a tollgate 21. In FIG. 5, the road 20 is viewed downward from a point above the road 20, and the vehicle 10 travels in a direction from a lower part toward an upper part on the paper plane of the drawing. Referring to the example illustrated in FIG. 5, a plurality of tollgates 21 are so arranged as to allow a plurality of vehicles to pass through the tollgates 21 in parallel. Accordingly, the tollgates 21 are provided in an increased-width section 20b of the road 20. The increased-width section 20b is a section in which the width of the road 20 is increased compared with that in a regular traveling section 20a. The process in step S120 may recognize entry of the vehicle 10 from the traveling section 20a to the increased-width section 20b.

When the increase in the width of the road on which the vehicle 10 travels is determined in step S120 (step S120: YES), the process to be performed by the controller 2 may proceed to step S200. In step S200, a transition is made from the regular traveling mode to a tollgate passing mode which will be described later.

Further, in step S120, the controller 2 may determine whether the width, of the road on which the vehicle 10 travels, that is to be recognized by the outside environment recognizer 3 is no longer recognizable. When the width of the road on which the vehicle 10 travels is no longer recognizable in step S120 (step S120: YES), the process to be performed by the controller 2 may proceed to step S200. In step S200, the controller 2 makes the transition in the operation mode, directed to causing the vehicle 10 to travel, from the regular traveling mode to the tollgate passing mode.

An outline of processes performed by the controller 2 in the tollgate passing mode may be as follows. That is, the controller 2 may set a target path on the basis of a position, relative to the vehicle 10, of the tollgate that is recognized by the outside environment recognizer 3. Further, the controller 2 may so control each of the traveling speed and the steering angle of the vehicle 10 that the vehicle 10 travels along the set target path. The target path may be a path along which the vehicle 10 is to pass through the tollgate.

Specific processes performed by the controller 2 in the tollgate passing mode may be as follows. In step S210, the controller 2 may first determine whether the position of the tollgate is recognizable by the outside environment recognizer 3.

Figure 3:
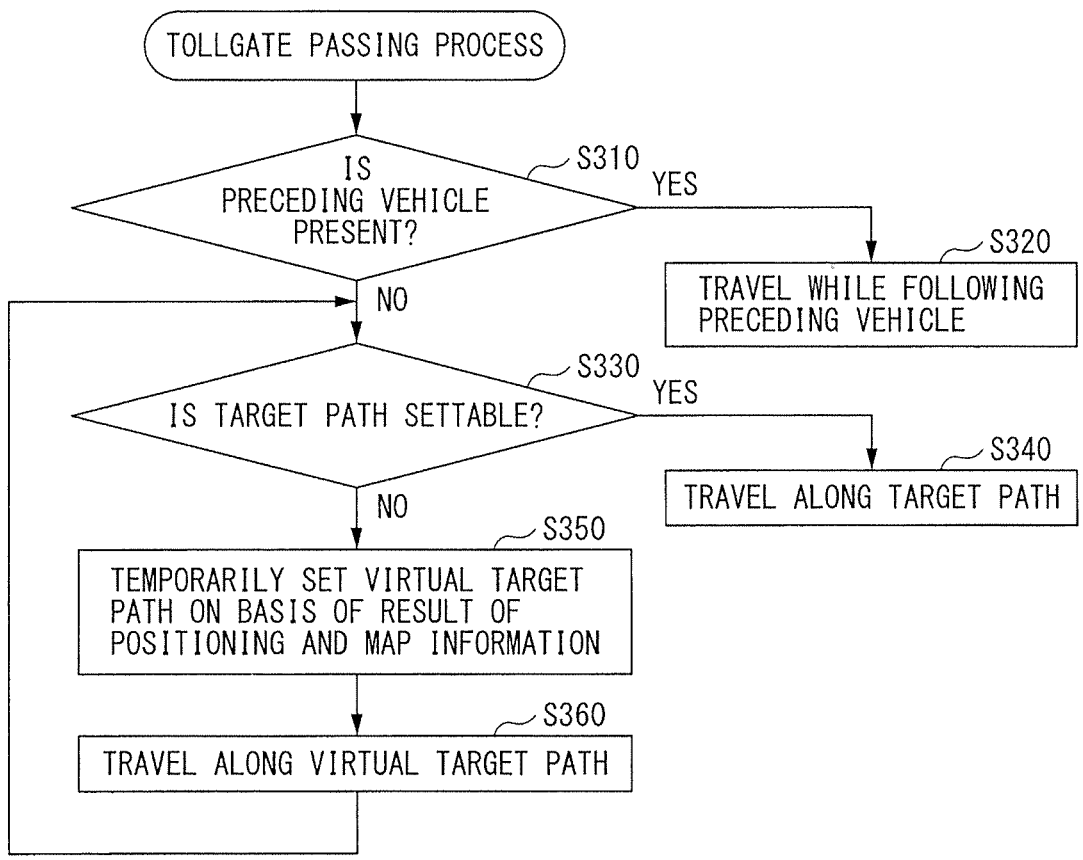
FIG. 3 is a flowchart of an example of a tollgate passing process.

When the position of the tollgate is recognizable by the outside environment recognizer 3 in step S210 (step S210: YES), the process to be performed by the controller 2 may proceed to step S300. In step S300, the controller 2 may execute a tollgate passing process. FIG. 3 illustrates a flowchart of an example of the tollgate passing process.

The tollgate passing process may include the following processes. In step S310, the controller 2 may first determine whether the preceding vehicle that travels ahead of the vehicle 10 and toward the tollgate is recognized by the outside environment recognizer 3.

When determination is made in step S310 that the preceding vehicle is recognized by the outside environment recognizer 3 (step S310: YES), the flow may proceed to step S320. In step S320, the controller 2 may set, as the target path, a path along which the vehicle 10 is to follow the preceding vehicle. Further, in step S320, the controller 2 may so control each of the traveling speed and the steering angle of the vehicle 10 that the vehicle 10 passes through the tollgate while following the preceding vehicle. After the vehicle 10 passes through the tollgate, the controller 2 may make a transition in the operation mode directed to traveling of the vehicle 10 from the tollgate passing mode to the regular traveling mode.

In contrast, when determination is made in step S310 that the preceding vehicle is not recognized by the outside environment recognizer 3 (step S310: NO), the flow may proceed to step S330. In step S330, the controller 2 may determine whether the target path is settable that allows the vehicle 10 to pass through the tollgate recognized by the outside environment recognizer 3.

When determination is made in step S330 that the target path is settable (step S330: YES), the flow may proceed to step S340. In step S340, the controller 2 may so control each of the traveling speed and the steering angle of the vehicle 10 that the vehicle 10 travels along the target path that passes through the tollgate. After the vehicle 10 passes through the tollgate, the controller 2 may make the transition in the operation mode directed to traveling of the vehicle 10 from the tollgate passing mode to the regular traveling mode.

In contrast, when determination is made in step S330 that the target path is not settable (step S330: NO), the flow may proceed to step S350. In step S350, the controller 2 may calculate the position of the tollgate relative to the vehicle 10 on the basis of the result of the positioning by the positioning device 5 and the map information stored in the map information output device 6. Further, in step S350, the controller 2 may set, as a virtual target path, a path along which the vehicle 10 is to pass through the tollgate, on the basis of a result of the calculation.

Thereafter, in step S360, the controller 2 may so control each of the traveling speed and the steering angle of the vehicle 10 that the vehicle 10 travels along the virtual target path set in step S350. Thereafter, the flow may return to step S330.

As described above, in the tollgate passing process, the controller 2 may set the virtual target path on the basis of the map information and the result of the positioning of the vehicle 10 by the positioning device 5, and cause the vehicle 10 to travel toward the tollgate, when the target path along which the vehicle 10 is to pass through the tollgate is unsettable on the basis of the result of the recognition by the outside environment recognizer 3. Further, the controller 2 may cause the vehicle 10 to travel toward the tollgate along the set virtual target path. Thereafter, at a time point at which the target path along which the vehicle 10 is to pass through the tollgate becomes settable on the basis of the result of the recognition by the outside environment recognizer 3, the controller 2 may cause the vehicle 10 to travel toward the tollgate on the basis of the result of the recognition by the outside environment recognizer 3.

Figure 4:
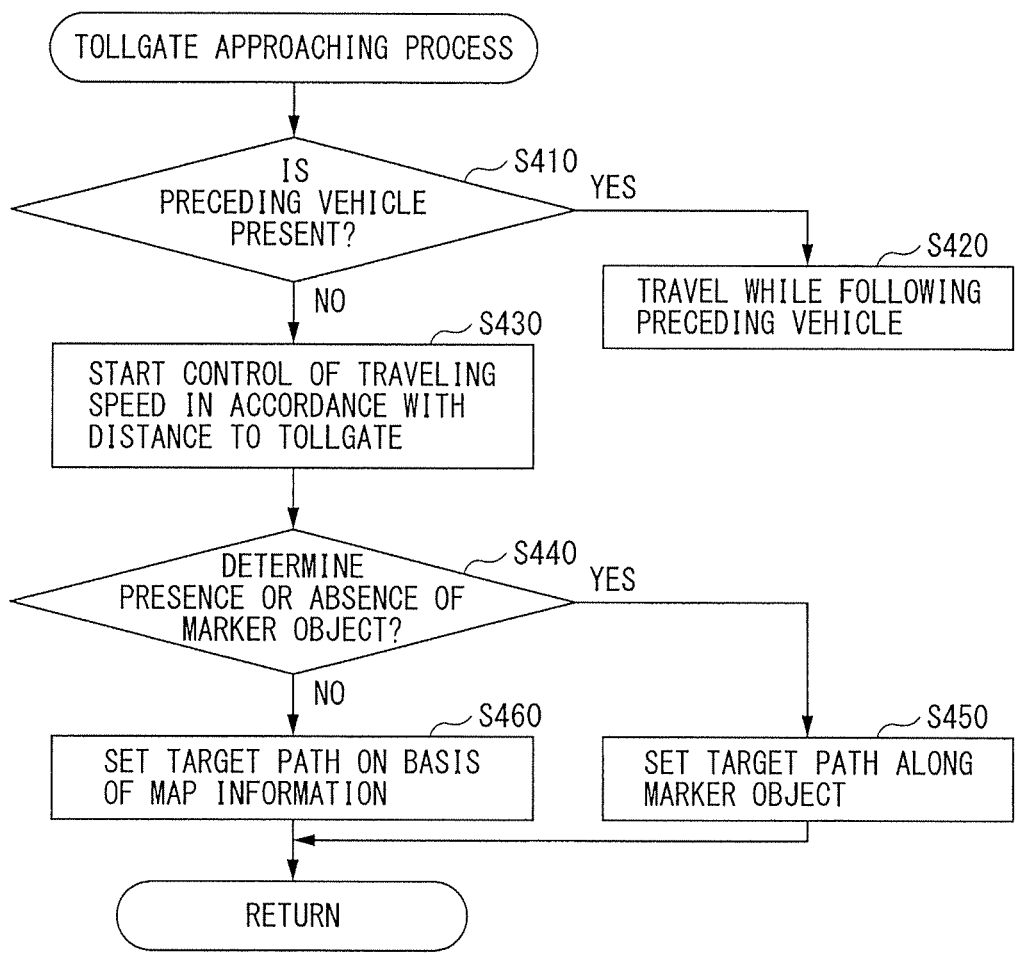
FIG. 4 is a flowchart of an example of a tollgate approaching process.

Now, the description returns to that of the process in step S210 of the flowchart illustrated in FIG. 2. When the determination is made in step S210 that the position of the tollgate is unrecognizable by the outside environment recognizer 3 (step S210: NO), the process to be performed by the controller 2 may proceed to step S400. In step S400, the controller 2 may execute a tollgate approaching process. FIG. 4 illustrates a flowchart of an example of the tollgate approaching process.

The tollgate approaching process may include the following processes. In step S410, the controller 2 may first determine whether the preceding vehicle that travels ahead of the vehicle 10 and toward the tollgate is recognized by the outside environment recognizer 3.

When determination is made in step S410 that the preceding vehicle is recognized by the outside environment recognizer 3 (step S410: YES), the flow may proceed to step S420. In step S420, the controller 2 may set, as the target path, a path along which the vehicle 10 is to follow the preceding vehicle. Further, in step S420, the controller 2 may so control each of the traveling speed and the steering angle of the vehicle 10 that the vehicle 10 passes through the tollgate while following the preceding vehicle. After the vehicle 10 passes through the tollgate, the controller 2 may make the transition in the operation mode directed to traveling of the vehicle 10 from the tollgate passing mode to the regular traveling mode.

In contrast, when determination is made in step S410 that the preceding vehicle is not recognized by the outside environment recognizer 3 (step S410: NO), the flow may proceed to step S430.

In step S430, the controller 2 may start a control that decreases the traveling speed of the vehicle 10 in accordance with a decrease in distance from the vehicle 10 to the position, of the tollgate, that is determined on the basis of the map information. The execution of the process in step S430 creates a margin for execution of processes subsequent to the process in step S430 and thereby allows the outside environment recognizer 3 to recognize the position of the tollgate.

Thereafter, in step S440, the controller 2 may determine presence or absence of an object that is disposed along an estimated path from the current position of the vehicle 10 to the position of the tollgate determined on the basis of the map information. The controller 2 may perform the foregoing determination by comparing the map information and the position information of the object recognized by the outside environment recognizer 3.

In one implementation, non-limiting examples of the object disposed along the estimated path may include a linear mark, a dashed-line mark, a curb, a guardrail, and a side wall that are provided on a road. The object disposed along the estimated path is hereinafter referred to as a marker object.

When the marker object is recognized by the outside environment recognizer 3 in step S440 (step S440: YES), the process to be performed by the controller 2 may proceed to step S450.

In step S450, the controller 2 may set the target path along the marker object, and so start the control of each of the traveling speed and the steering angle of the vehicle 10 that the vehicle 10 travels along the set target path. Thereafter, the flow may return to step S210 of the flowchart illustrated in FIG. 2. In other words, in step S450, the controller 2 may set the target path on the basis of position information of the marker object.

In contrast, when no marker object is recognized by the outside environment recognizer 3 in step S440 (step S440: NO), the process to be performed by the controller 2 may proceed to step S460. In step S460, the controller 2 may set the estimated path as the target path, and so start the control of each of the traveling speed and the steering angle of the vehicle 10 that the vehicle 10 travels along the set target path. Thereafter, the flow may return to step S210 of the flowchart illustrated in FIG. 2. In other words, in step S460, the controller 2 may set the target path on the basis of the map information.

In FIG. 5, the position of the tollgate determined on the basis of the map information is indicated by a dashed-two-dotted line and denoted by the numeral 21*a*. Further, information on a shape of the road 20 in the map information, i.e., road shape information, is indicated by a dotted line and denoted by the numeral 22 in FIG. 5.

In a situation illustrated in FIG. 5, the estimated path from the current position of the vehicle 10 to the position 21*a* of the tollgate determined on the basis of the map information is substantially coincident with the road shape information 22 that is based on the map information and indicated by the dotted line. When the process in step S440 is executed in the situation illustrated in FIG. 5, the controller 2 may determine whether the object disposed along the road shape information 22 is recognized by the outside environment recognizer 3.

In one implementation, when a shape of the linear mark denoted by the numeral 23 in FIG. 5 is similar to the estimated path, i.e., the road shape information 22 in this example, the linear mark 23 may be recognized as the marker object by the controller 2, for example.

As described above, in the gate approaching process, the controller 2 may set the temporal target path on the basis of one or both of the map information and the position information of the object recognized by the outside environment recognizer 3, and thereby cause the vehicle 10 to travel toward the tollgate 21. Further, at a time point at which the tollgate 21 becomes recognizable by the outside environment recognizer 3 owing to the approach of the vehicle 10 to the tollgate 21, the controller 2 may cause the vehicle 10 to travel toward the tollgate 21 on the basis of the result of the recognition by the outside environment recognizer 3.

A description is further given of the operation described above, with reference to FIG. 5. When the vehicle 10 travels in the traveling section 20*a* of the road 20, the automatic driving control apparatus 1 may operate in the regular traveling mode. Therefore, the controller 2 may so control each of the traveling speed and the steering angle of the vehicle 10 that the vehicle 10 travels along the shape of the road recognized by the outside environment recognizer 3. As described above, the outside environment recognizer 3 may detect the linear mark, the dashed-line mark, the curb, the guardrail, the side wall, or any other object that is provided along the traveling lane on the road. Further, the outside environment recognizer 3 may recognize the shape of the road on the basis of the result of the detection.

Further, when the vehicle 10 approaches the tollgates 21 and enters the increased-width section 20*b* from the traveling section 20a, it may become difficult for the controller 2 to set, in the regular traveling mode, the target path along which the vehicle 10 is to travel. One possible reason for this is that the width of the road recognized by the outside environment recognizer 3 is excessively great compared with the width of the vehicle 10 in the increased-width section 20b, leading to difficulty in determining which part of the road having the excessively-great width the vehicle 10 is to be caused to travel. Another possible reason is that the shape of the road becomes unrecognizable by the outside environment recognizer 3 in the increased-width section 20b. For example, such a situation may occur: on a condition that the linear mark, the dashed-line mark, the curb, the guardrail, the side wall, or any other object that is provided on the road is not provided in the increased-width section 20b; on a condition that the linear mark, the dashed-line mark, or the foregoing object provided on the road is out of a range recognizable by the outside environment recognizer 3; or on any other condition.

The controller 2 in the automatic driving control apparatus 1 according to the present implementation may determine that the vehicle 10 travels in the increased-width section 20b, on any of: a condition that the tollgates 21 are present ahead of the vehicle 10 within the predetermined distance from the vehicle 10, and the increase in width of the road on which the vehicle 10 travels is recognized by the outside environment recognizer 3; and a condition that the tollgates 21 are present ahead of the vehicle 10 within the predetermined distance from the vehicle 10, and the width and the shape of the road on which the vehicle 10 travels becomes unrecognizable by the outside environment recognizer 3 (step S120: YES). Further, when determination is made that the vehicle 10 travels in the increased-width section 20b (step S120: YES), the controller 2 may make the transition to the tollgate passing mode (step S200).

When the position of the tollgate 21 is recognizable by the outside environment recognizer 3 at a time point at which the transition to the tollgate passing mode is performed, the controller 2 may execute the tollgate passing process described in FIG. 4. In the tollgate passing process, the controller 2 may set the target path of the vehicle 10 on the basis of one of the position information of the tollgates 21 recognized by the outside environment recognizer 3 and the position information of the tollgates 21 determined on the basis of the map information. Hence, according to the automatic driving control apparatus 1 of the present implementation, it is possible to continue the automatic driving control even in a section, of the road, in which the vehicle 10 passes through any of the tollgates 21.

When the position of the tollgate 21 is unrecognizable by the outside environment recognizer 3 at the time point at which the transition to the tollgate passing mode is performed, the controller 2 may execute the tollgate approaching process described in FIG. 5. In the tollgate approaching process, the controller 2 may cause the vehicle 10 to approach the tollgate 21 on the basis of one or both of the map information and the position information of the object recognized by the outside environment recognizer 3. Hence, according to the automatic driving control apparatus 1 of the present implementation, it is possible to continue the automatic driving control even when the tollgate 21 is unrecognizable by the outside environment recognizer 3 at the time point at which the vehicle 10 enters the increased-width section 20b.

Note that it is desired that automatic driving is continued also in a section, of a road, in which a vehicle passes through a tollgate, in a case where the vehicle travels on a toll road by automatic driving by means of an automatic driving control apparatus. In a section, of the road, provided with the tollgate, however, a linear or dashed-line mark indicating a traveling lane on the road may not be provided in some cases. Therefore, it may be difficult for a typical existing automatic driving control apparatus according to a comparative example to recognize a shape of the road, and accordingly, to perform the automatic driving.

Figure 6:
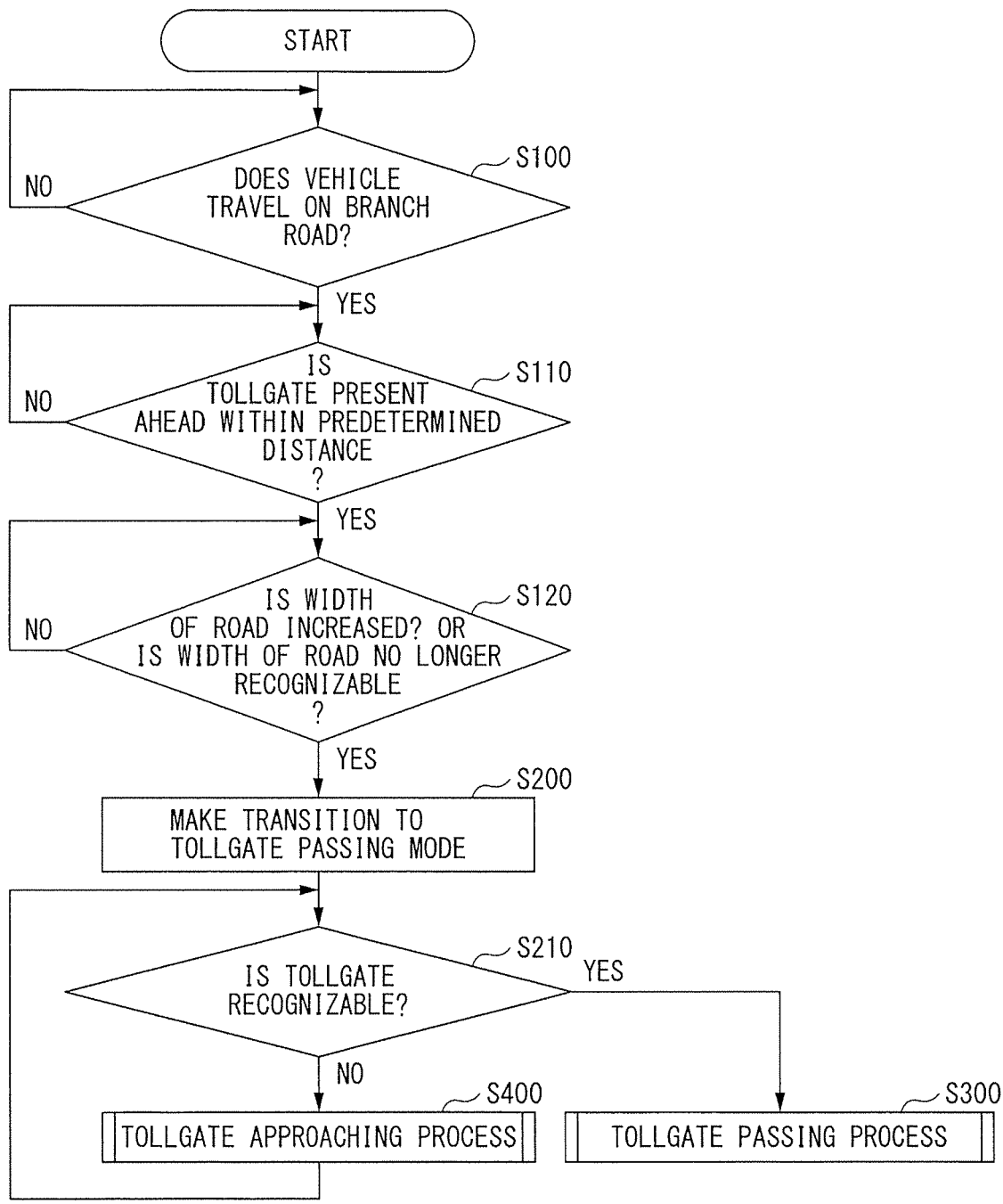
FIG. 6 is a flowchart describing an example of an operation of the automatic driving control apparatus according to a modification example.

FIG. 6 illustrates a flowchart describing an operation of the automatic driving control apparatus 1 according to a modification example of the present implementation.

The flowchart illustrated in FIG. 6 is different from the flowchart illustrated in FIG. 2 in that step S100 is inserted before step S110.

In step S100, the controller 2 may determine whether the vehicle 10 travels on a branch road branched from a main road of a toll road. Non-limiting examples of the branch road may include an entering road that allows for entry to the main road of the toll road, a road coupled to the entering road, an exiting road that allows for exiting from the main road of the toll road, and a road coupled to the exiting road. The road coupled to the entering road refers to a road within a predetermined distance to an entrance of the entering road. The road coupled to the exiting road refers to a road within a predetermined distance from an exit of the exiting road.

The flow may proceed to step S110 only when the controller 2 determines, in step S100, that the vehicle 10 travels on the branch road branched from the main road of the toll road (step S100: YES). In other words, the automatic driving control apparatus 1 according to the present modification example may not make the transition to the tollgate passing mode: in a case where the vehicle 10 travels on the main road of the toll road; in a case where the vehicle 10 travels on a road that is located farther from the entrance or the exit of the toll road than the predetermined distance; or in any other case where the vehicle 10 travels in a section in which the possibility that the tollgate is provided is low.

The possibility that the tollgate is provided on a road excluding the branch road is low. Therefore, the automatic driving control apparatus 1 according to the present modification example may halt the processes in step S110 and subsequent steps when the vehicle 10 travels in a section in which the possibility that the tollgate is provided is low, thereby reducing a load on the controller 2. Hence, it is possible to suppress power consumption.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In one implementation described above, the controller 2 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 2. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

The invention claimed is:

1. An automatic driving control apparatus comprising:
a controller configured to:
 detect, using a first sensor, an outside environment of a vehicle;
 detect, using a second sensor, a traveling state of the vehicle;
 detect, using a third sensor, a current position of the vehicle;
 store, in a data storage, map information including information on a road shape;
 execute an automatic driving control of the vehicle based on one or more of the detected outside environment, the detected traveling state of the vehicle, the detected current position of the vehicle, and the stored map information;
 in response to executing the automatic driving control, determine, based on the detected current position of the vehicle and the stored map information, whether a tollgate exists within a predetermined distance from the vehicle on a road on which the vehicle travels;
 switch an operation mode of the vehicle from a regular traveling mode to a tollgate passing mode based on 1) determining that the tollgate exists within the predetermined distance from the vehicle and an increase in width of the road is recognized based on the detected outside environment, or 2) determining that the tollgate exists within the predetermined distance from the vehicle and the width of the road becomes unrecognizable based on the detected outside environment;
 during a first period in which the operation mode of the vehicle is set to the tollgate passing mode and a position of the tollgate is unrecognized based on the detected outside environment, control each of a traveling speed of the vehicle and a steering angle of the vehicle to thereby cause the vehicle to approach the tollgate based on one or both of 1) the stored map information and 2) position information of an object that is recognized based on the detected outside environment; and
 during a second period in which the operation mode of the vehicle is set to the tollgate passing mode and a position of the tollgate is recognized based on the detected outside environment, control each of the traveling speed of the vehicle and the steering angle of the vehicle to thereby cause the vehicle to pass through the tollgate based on a position of the tollgate that is recognized based on the detected outside environment.

2. The automatic driving control apparatus according to claim 1, wherein,
during the first period, the controller:
 recognizes, as a marker object, the object that 1) is recognized based on the detected outside environment and 2) is disposed along an estimated path, the estimated path being a path from the current position of the vehicle to the position of the tollgate based on the stored map information; and
 controls each of the traveling speed of the vehicle and the steering angle of the vehicle to thereby cause the vehicle to approach the tollgate along the marker object.

3. The automatic driving control apparatus according to claim 1, wherein, at a time when the operation mode of the vehicle is switched from the regular traveling mode to the tollgate passing mode, the controller starts a control to decrease the traveling speed of the vehicle in accordance with a decrease in distance between the current position of the vehicle to the position of the tollgate detected from the stored map information.

4. The automatic driving control apparatus according to claim 2, wherein, at a time when the operation mode of the vehicle is switched from the regular traveling mode to the tollgate passing mode, the controller starts a control to decrease the traveling speed of the vehicle in accordance with a decrease in distance between the current position of the vehicle to the position of the tollgate detected from the stored map information.

5. The automatic driving control apparatus according to claim 1, wherein the controller switches the operation mode of the vehicle from the regular traveling mode to the tollgate passing mode further based on a condition that the vehicle travels on a branch road that branched from a main road of a toll road.

6. The automatic driving control apparatus according to claim 2, wherein the controller switches the operation mode of the vehicle from the regular traveling mode to the tollgate passing mode further based on a condition that the vehicle travels on a branch road that branched from a main road of a toll road.

7. The automatic driving control apparatus according to claim 3, wherein the controller switches the operation mode of the vehicle from the regular traveling mode to the tollgate passing mode further based on a condition that the vehicle travels on a branch road that branched from a main road of a toll road.

8. The automatic driving control apparatus according to claim 4, wherein the controller switches the operation mode of the vehicle from the regular traveling mode to the tollgate passing mode further based on a condition that the vehicle travels on a branch road that branched from a main road of a toll road.

* * * * *